United States Patent [19]

Robinson et al.

[11] 4,052,535

[45] Oct. 4, 1977

[54] SODIUM-SULPHUR CELLS

[75] Inventors: Graham Robinson, Chester; Michael Patrick Joseph Brennan, Warrington; Ivor Wynn Jones, Chester, all of England

[73] Assignee: Chloride Silent Power Limited, England

[21] Appl. No.: 715,800

[22] Filed: Aug. 19, 1976

[30] Foreign Application Priority Data

Aug. 20, 1975 United Kingdom ............... 34680/75

[51] Int. Cl.² ......................................... H01M 10/39
[52] U.S. Cl. .................................. 429/104; 429/122; 429/233
[58] Field of Search .................... 429/104, 101, 30, 31, 429/191, 218, 122, 163, 233

[56] References Cited

U.S. PATENT DOCUMENTS

| 3,980,496 | 9/1976 | Ludwig et al. | 429/103 |
| 3,982,957 | 9/1976 | Jones et al. | 429/163 |

*Primary Examiner*—Anthony Skapars
*Attorney, Agent, or Firm*—Beveridge, De Grandi, Kline & Lunsford

[57] ABSTRACT

In a sodium-sulphur cell having a solid electrolyte and a cathode current collector with a porous conductive matrix, e.g. carbon or graphite felt, in the region between the electrolyte and the current collector, the matrix is formed of a plurality of discrete elements with electronically conductive material, e.g. graphite foil, between the elements extending across the region between the current collector and the electrolyte to increase the conductivity across that region.

15 Claims, 5 Drawing Figures

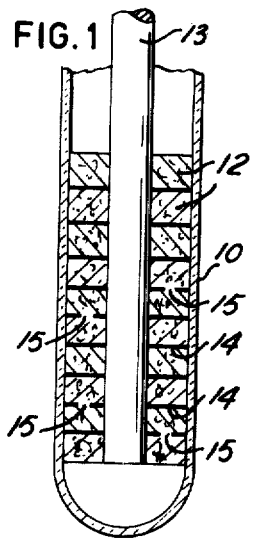
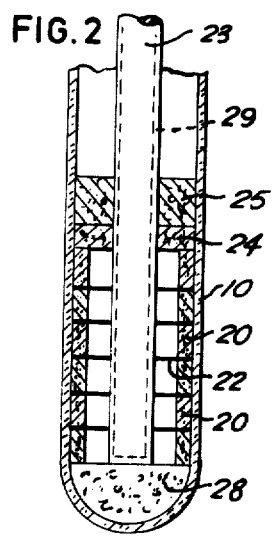
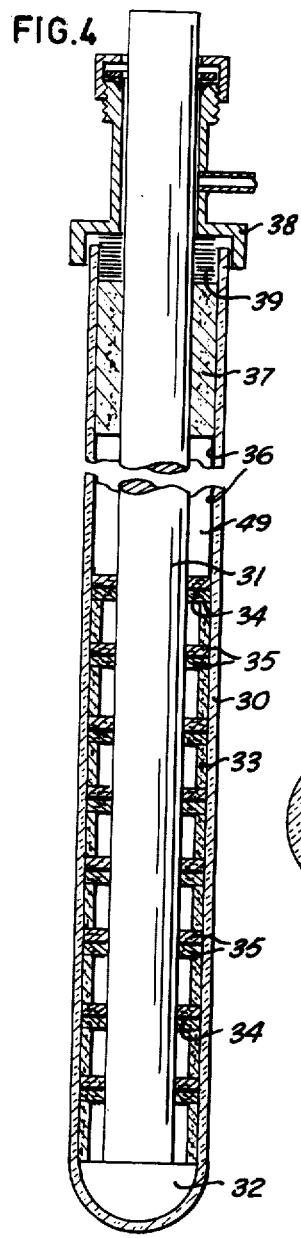
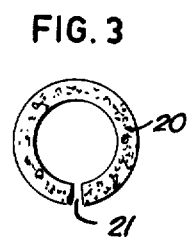
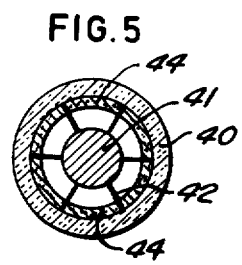

SODIUM-SULPHUR CELLS

BACKGROUND OF THE INVENTION

A sodium-sulphur cell has a solid electrolyte, usually of beta-alumina, which separates molten sodium forming the anode from a cathodic reactant; the cathodic reactant comprises essentially liquid sulphur together with polysulphides of sodium produced by the passage of sodium ions through the electrolyte into the cathodic reactant material. The liquid sodium is a good electrical conductor and there is thus little problem in effecting electrical contact to the sodium which constitutes one of the electrodes of the cell. The cathodic reactant however is a poor electronic conductor as well as being highly reactive chemically. It is necessary therefore to provide, in the liquid reactant material, an electronic conductor. This has to be porous to permit of free access of the cathodic reactant material to the neighbourhood of the electrolyte. Electrically, this conductor forms the path or part of the path from a cathode current collector for the electrical charge given up by the sodium ions which pass through the electrolyte and combine with the sulphur in cathodic reactant material. It is the usual practice to employ carbon or graphite felt as the porous electronic conductor in the cathodic reactant. Carbon or graphite is used in order to withstand the corrosive conditions of the molten cathodic reactant. The material is typically composed of carbon fibres about 10 microns diameter in a loosely packed assembly with an overall density of about $0.1$ g cm$^{-3}$ which represents a porosity of approximately 95%. The felt material provides adequate surface area for the electrochemical reaction to take place but the pore structure is not favourable for the flow of the liquid reactant material within the electrode. The fibres in the material are not rigidly interconnected and felt can be compressed in one direction to about half its natural thickness without damage. This property is advantageous in that, in a cell having electrolyte in the form of a tube with an annular cathodic region, the felt can be compressed into the annular space in such a way that pressure is maintained between the felt and the current collector; this effects a low contact resistance between the felt and current collector. However this fibre structure has the disadvantage that fibre to fibre contact is poor and may vary during some operations. Thus during continued operation of a cell, both the electrical characteristics and pore structure of the electrode may deteriorate.

SUMMARY OF THE INVENTION

It is an object of the present invention to provide, in a sodium-sulphur cell, an improved form of electronic conductive structure for the cathode electrode.

In a sodium-sulphur cell having a graphite felt matrix, the sulphur electrode is a region, usually several millimeters thick, in which the current is progressively transformed from electronic current at the current collector to ionic current at the electrolyte surface. The electronic current from the current collector is dispersed through the sulphur electrode by the fibre material in the matrix and is transferred, by electrochemical reaction, to the molten reactants at the surface of the matrix material. The net effect of the reaction is to transfer the current from electrons to sodium ions. This transfer must be completed when the electrolyte surface is reached as only the sodium ions will flow in the electrolyte.

If the fibre resistance and the transfer resistance are low compared with the resistance of the polysulphides, then the current will flow mostly through the felt and can transfer, using only a small part of the electrode volume, to the polysulphide close to the electrolyte surface, travelling only a short distance in the polysulphide. If, on the other hand, the resistance of the felt is high, the current will transfer to the lower-resistance polysulphides close to the current collector. If the transfer resistance is high, the reaction rate will be more uniformly distributed so that the maximum area of fibre surface can be used.

According to this invention, in a sodium-sulphur cell having a solid electrolyte and a cathode current collector with a porous conductive matrix in the region between the electrolyte and the current collector, the matrix is formed as a plurality of discrete elements with electronically conductive material between the elements and extending across the region between the current collector and the electrolyte to increase the conductivity across that region.

Conveniently the electrolyte in a sodium-sulphur cell is in the form of a tube. The cathodic region may be an annular region between the electrolyte and a surrounding cylindrical current collector, e.g. a metal casing for the cell. It is preferred however to have the cathode inside the electrolyte tube and in this case, the current collector is conveniently a rod or tube inside the electrolyte tube. In each case, the electronically conductive material is arranged to extend across the annular cathodic region between the electrolyte surface and the current collector.

The invention thus includes within its scope a sodium-sulphur cell comprising a solid electrolyte tube with sodium adjacent the outer surface of the electrolyte, an axially-disposed cathode current collector within the electrolyte tube and a matrix of graphite or carbon material containing the cathodic reactant in the annular region between the electrolyte tube and the current collector, wherein the matrix comprises a plurality of discrete elements of porous graphite or carbon material with electronically conductive material between the elements and extending across the region between the current collector and the electrolyte to increase the conductivity in the radial direction.

When a sodium-sulphur cell is re-charged, the sodium polysulphides in the cathodic reactant material are converted to sulphur which has a high electrical resistance. If the electrochemical reaction takes place close to the surface of the electrolyte tube, the high impedance of the sulphur can inhibit the re-charge process in the remainder of the material away from the electrolyte surface except in so far as the polysulphides flow into the appropriate region for the electrochemical reaction to take place. In sodium-sulphur cells heretofore, it has been the practice to fill the cathodic region with carbon or graphite felt. The lower the electrical resistance of this material, the greater is the tendency of the current to flow through the felt from the current collector and for the reaction to take place close to the electrolyte. On the other hand, if the resistance of the felt is increased, for example by packing it less densely, then it has a smaller surface area and its surface activity is reduced. This reduces the ability of the cell to discharge rapidly. By the arrangement of the present invention, low resistance paths are provided extending from the electrolyte across the cathodic region. It thus becomes possible to use a matrix having a higher resistance or a higher transfer resistance so that the electro-chemical activity is more widely dispersed but to retain a low overall electrical resistivity. In other words it becomes possible to increase the resistance of the body of the matrix so as to produce a cell having a good capacity retention but without loss of power output.

In a tubular cell, the matrix may comprise elements of carbon or graphite felt with electronically conductive material in radially extending planes between the elements. These radially extending planes may be planes normal to the axis of the assembly or planes containing the axis of the assembly. In some cases, instead of using carbon or graphite felt, reticulated vitreous carbon elements may be employed. In a tubular cell with the cathode inside the electrolyte tube, the matrix elements may be arranged adjacent the inner surface of the electrolyte tube and extend only part of the way inwardly towards the current collector and, in this case, the conductor material may comprise sheet material extending between the current collector and the electrolyte tube.

More generally however the matrix elements would extend radially across the region between the electrolyte and the current collector and the electronically conductive material may be sandwiched between such elements. In this latter case particulate conductive material, for example carbon flakes, might be employed. It is convenient however to use graphite foil (that is to say compressed graphite flakes) or an electrical conductor such as aluminium foil coated with a material such as molybdenum or graphite which is chemically inert to the materials in the cathodic region of the cell.

If electronic current collectors in the form of foil or other sheet material extend completely across the annular cathodic region in a tubular cell between the current collector and the electrolyte tube, preferably they may be perforated to permit of axial flow of cathode reactant material. Alternatively, the current collector may have longitudinal grooves to permit of such flow.

Preferably the spacing of the washers or other electronic conductors is equal to or less than the radial distance between the current collector and the electrolyte tube. Thus, for regions remote from the current collector, a lower resistance electronically conductive path to the collector is provided through the conductor rather than through the neighbouring matrix material. This arrangement is particularly useful for thick electrodes. In such thick electrodes, it is beneficial to increase the transfer resistance, that is to say the resistance to the transfer of the electronic current from the fibres of the matrix to the molten reactants by means of the electrochemical reaction, and to make use of the electronic conductors to reduce the electronic impedance.

In one convenient form of construction, a cathode assembly for a tubular sodium-sulphur cell is formed by putting, on a cathode current collector rod, washers of electronically conductive material, e.g. graphite foil or coated aluminium, these washers alternating with washers of graphite or carbon felt. The washers preferably extend outwardly so that both the conductive washers and the felt are in contact with the inner surface of the electrolyte tube when the current collector rod is assembled in the tube.

BRIEF DESCRIPTION OF THE DRAWINGS

FIG. 1 is a longitudinal section through the cathode compartment of sodium-sulphur cell;

FIG. 2 is a section similar to FIG. 1 of another construction of sodium-sulphur cell;

FIG. 3 is a plan view of an annular reticulated vitreous carbon element used in the cell of FIG. 2;

FIG. 4 is a longitudinal section through the cathode compartment of yet another construction of sodium-sulphur cell; and FIG. 5 is a cross-section through the cathode compartment of a further construction of sodium-sulphur cell.

DESCRIPTION OF THE PREFERRED EMBODIMENTS

FIG. 1 shows a beta-alumina ceramic tube 10 closed at one end and which forms the solid electrolyte of a sodium-sulphur cell. The figure shows only the tube 10 with the cathode structure in the tube. Liquid sodium forming the anode would be put around the outer surface of the tube within an outer container. Within the cathode compartment are a number of annuli 12 formed of graohite felt. This felt material is formed with a central hole so that it fits over a central carbon current collector 13 with a tight fit giving good electrical contact. A series of rings 12 of the carbon felt are assembled on the current collector alternating with washers 14 of electronically conductive material. This electronically conductive material must be a material which is chemically inert to the materials present in the cathodic region of the sodium-sulphur cell. Typically these washers might be formed of graphite foil, that is to say graphite flakes compressed into sheet material. Other materials which might be used for the washers 14 are metals, such as aluminium, coated with a suitable coating such as molybdenum or graphite which is chemically inert to the cathodic reactant. The washers 14 extend radially outwardly to reach the surface of the electrolyte tube. The axial length of the graphite felt elements 12 is made less than the radial spacing between the current collector tube 13 and the inner surface of the electrolyte tube so that, throughout the bulk of the matrix, electronically conductive paths to the current collector are provided through the washers 14, such paths being of lower resistance than the direct path from the electrolyte to the current collector tube. To permit of axial flow of the sulphur/polysulphide material forming the cathode reactant, holes 15 are formed in the washers 14.

In the construction shown in FIG. 2 there is shown a beta-alumina electrolyte tube 10 within which is the cathode compartment. A number of annuli 20 of reticulated vitreous carbon material are formed with an outer diameter slightly greater than the internal diameter of the tube 10. The annuli each have a small sector cut out, as shown in FIG. 3 at 21, so that they may be sprung into position within the tube 10 and will lie in close contact against the external surface thereof. Within the tube 10, the annuli 20 are separated by washers 22 of graphite foil. Each washer 22 extends from the internal surface of the electrolyte tube 10 inwardly to a graphite rod 23 which is arranged axially within the cell to form a cathode current collector. The reticulated vitreous carbon annuli 20 and the graphite foil washers 22 are compressed by means of a carbon felt pad 24 and a solid carbon block 25 which is forced downwardly into the electrolyte tube by means not shown. The lower end of the electrolyte tube contains graphite felt 28. Grooves 29 are formed in the current collector rod extending longitudinally along the rod to permit flow of the cathodic reactant longitudinally. Alternatively apertures might be formed in the graphite foil as described with reference to FIG. 1 to permit of this longitudinal flow of the molten reactant.

With the construction of FIGS. 2 and 3 there is reticulated vitreous carbon material adjacent the inner face of the electrolyte tube. This material is electronically conductive without being dependent upon pressure contact between separate elements as in the felt. The porosity of the material permits of ready flow of the cathodic reactant in the region of the electrolyte tube. Because of the lower viscosity of the sodium polysulphide materials compared with the liquid sulphur at the temperature of operation of the sodium sulphur cell, the material flowing through the matrix will to a large extent comprise the sodium polysulphides. The graphite foil washers provide, as before, the required electronic conductivity between the matrix material and the graphite collector rod.

FIG. 4 illustrates another construction of the cathode electrode for a sodium-sulphur cell. In this figure there is shown a beta-alumina ceramic electrolyte tube 30 in which there is axially located a current collector rod 31 which may be a carbon rod or a rod or tube of other material chemically inert to the sulphur/ polysulphides or may be a composite collector having an outer coating or sheath of a suitably chemically inert material such as graphite or molybdenum and having an internal core of a material of higher electrical conductivity. In the closed end of the electrolyte tube 30 is a graphite plug 32 against which the end of the current collector rod abuts. The annular region between the current collector rod 31 and the internal surface of the electrolyte tube 30 contains the sulphur/polysulphide material. This internal surface, in the construction illustrated, has annuli 33 of reticulated vitreous carbon material lying around the inner surface of the electrolyte tube but spaced away from the current collector rod 31. Between these annuli are washers 34 of graphite foil, each washer being sandwiched between two annuli 35 of graphite felt. The graphite foil washers 34 with their adjacent layers 35 of graphite felt form electronic conductors extending the whole way between the electrolyte tube 30 and the current collector rod 31. To ensure electrical contact between the reticulated vitreous carbon elements 33 and the graphite felt 35, the assembly is compressed axially by means of a graphite sleeve 36 in the upper part of the electrolyte tube and a graphite plug 37 which is compressed by means of a closure member 38 which bears against a layer 39 of graphite felt lying on top of the plug 37. The vitreous carbon elements 33 are made with an outer diameter slightly larger than the internal diameter of the electrolyte tube and a small sector is cut out of each element so that the element can be compressed to fit within the electrolyte tube, the element thereby tending to spring outwardly against the surface of the tube. The aforementioned graphite sleeve 36 fits closely inside the electrolyte tube 30 and leaves a region above the matrix material 33, 35 forming a cathodic reservoir to accommodate the increase in volume of the cathode material as the cell discharges. As is well-known however such a cathodic reservoir can be provided in other ways so that the whole length of the electrolyte tube can be effectively used as an ionic conductor for the operation of the cell. In this construction, the graphite foil washers 34 and the adjacent graphite felt layers 35 together form electronic conductors providing the required conductivity between the reticulated vitreous carbon material 33 and the cathode current collector rod 31. Provision may be made for flow of electrolyte material by means of grooves in the current collector rod 31 or by means of holes in the graphite foil as previously described.

Instead of having the fins forming the electronic conductors extending in a plane normal to the axis of the assembly, as shown in FIGS. 1, 2 and 4, electronically conductive sheet material might be arranged to extend radially in planes containing the axis of the assembly as shown in FIG. 5. Referring to that figure, there is shown, in cross-section, a beta-alumina electrolyte tube 40 with an axially located graphite current collector rod 41, the rod 41 having cemented thereto by electrically conductive cement fins 42 of graphite foil which extend radially from the current collector rod to the surface of the electrolyte tube 40. In the sectorial spaces between the fins are arranged elements 44 of matrix material, for example reticulated vitreous carbon material. If this rigid material is employed, conveniently the elements are arranged as part annular elements lying adjacent the inner surface of the electrolyte tube 40 as shown. The material is assembled so that it is in close contact with the graphite foil fins which thereby provide electronically conductive paths between the reticulated carbon matrix material and the current collector rods.

We claim:

1. In a sodium-sulphur cell having a solid electrolyte and a cathode current collector with a porous conductive matrix in the region between the electrolyte and the current collector, the improvement in combination therewith comprising the matrix being formed of a plurality of discrete elements with electronically conductive material of a higher bulk conductivity than the matrix elements positioned between the elements and extending across the region between the current collector and the electrolyte to increase the conductivity across that region.

2. A sodium-sulphur cell as claimed in claim 1 wherein the electrolyte is tubular and wherein the cathodic region is an annular region between the electrolyte tube and an outer cylindrical cathode unit collector around the electrolyte tube.

3. A sodium-sulphur cell as claimed in claim 1 wherein the electrolyte is tubular and the cathode region is an annular region inside the electrolyte tube between the inner surface of that tube and an axially extending cathode current collector inside the electrolyte tube.

4. A sodium-sulphur cell as claimed in claim 1 wherein the matrix elements comprise graphite or carbon felt.

5. A sodium-sulphur cell as claimed in claim 1 wherein the matrix elements comprise reticulated vitrous carbon material.

6. A sodium sulphur cell comprising a solid electrolyte tube with sodium adjacent the outer surfaces of the electrolyte, an axially-disposed cathode current collector within the electrolyte tube and a matrix of graphite or carbon material containing the cathodic reactant in the annular region between the electrolyte tube and the current collector wherein the matrix comprises a plurality of discrete elements of porous graphite or carbon material with electronically conductive material of higher bulk conductivity than the elements positioned between the elements forming current paths extending in radial directions from the current collector to the surface of the electrolyte tube to increase the conductivity in said radial directions.

7. A sodium sulphur cell as claimed in claim 6 and wherein the matrix comprises elements of reticulated vitreous carbon with electronically conductive material in radially-extending planes between the elements.

8. A sodium sulphur cell as claimed in claim 6 and wherein the matrix comprises elements of carbon or graphite felt with electronically conductive means in radially-extending planes between the elements.

9. A sodium sulphur cell as claimed in claim 7 wherein the matrix elements are adjacent the inner surface of the electrolyte tube and extend only part of the way inwardly towards the current collector and wherein the conductive material comprises sheet material extending between the current collector and the electrolyte tube.

10. A sodium sulphur cell as claimed in claim 1 wherein the conductive material comprises graphite foil.

11. A sodium sulphur cell as claimed in claim 1 wherein the electronically conductive material comprises a metal coated with a conductive material chemically inert to the sulphur/polysulphides.

12. A sodium sulphur cell as claimed in claim 1 wherein the matrix material extends through the whole region between the current collector and the electrolyte tube.

13. A sodium sulphur cell as claimed in claim 1 wherein the matrix material comprises a layer adjacent the surface of the electrolyte tube.

14. A sodium sulphur cell as claimed in claim 12 wherein the electronically conductive material comprises graphite flakes between the matrix elements.

15. A sodium sulphur cell having an annular cathodic region between an electrolyte tube and a cathode current collector, which annular region comprises annular elements of carbon or graphite material impregnated with cathodic reactant with washers of electronically conductive material chemically inert to the cathodic reactant between said annular elements, the material of said washers having a higher bulk conductivity than the annular elements, said washers extending radially between the current collector and the electrolyte.

* * * * *